Nov. 14, 1961  J. A. MISENER  3,008,350
DIFFERENTIAL LOCKING DEVICES
Filed Aug. 22, 1960

INVENTOR
JOSEPH A. MISENER
BY Frederick E. Bromley
ATTORNEY

United States Patent Office 3,008,350
Patented Nov. 14, 1961

3,008,350
DIFFERENTIAL LOCKING DEVICES
Joseph A. Misener, 1795 Byng Ave., Niagara Falls,
Ontario, Canada
Filed Aug. 22, 1960, Ser. No. 51,125
8 Claims. (Cl. 74—710.5)

My invention relates to new and useful improvements in locking devices for differential gears. Locking devices of this type function to lock the two aligned live axle shafts together so that they are obliged to rotate as a unit and to equalize the tractive force of the road wheels of an automobile.

According to prior art structures various differential locking devices have been proposed but many such prior art devices involve the provision of control mechanism for the operator of the motor vehicle which is a drawback and due to inherent short comings they have not become popular with automobile manufacturers. Moreover, prior art devices of the kind referred to are as a whole complicated and expensive to manufacture.

It is a primary object of the present invention to provide an improved differential locking device which is adapted to be installed on most types of automobile vehicles without requiring alterations and modifications of the standard differential gear assembly, and moreover to provide an improved structure which is possessed of a minimum number of parts and is economical to manufacture.

A still further aim of the invention is to provide an improved locking device of this character which requires no control mechanism and wherein the locking action is automatic and reliable. A still further aim of the invention is to provide a locking device devised to have a normal locking action so that the two live axle shafts of the differential assembly will normally rotate in unison to provide for equal traction effect on the part of the road wheels, and which will be capable of providing for either one of the road wheels turning faster than the other as required when the vehicle deviates from a straight course as in making a turn.

Still a further aim of the invention is to provide a differential locking device comprising a pair of co-acting wedge blocks operably disposed to spread between the terminal faces of the differential gear axles for locking the differential gears along with their axles to the differential gear case and capable of unlocking said axles when one of the differential gears advance ahead of the other as in a turning movement on the part of the vehicle.

A highly important feature of the wedge blocks is that they have mating wedge faces which bring about the locking effect and are urged by spring pressure into frictional engagement with the terminal faces of the live axle shafts of the differential assembly. These co-acting wedge blocks function smoothly and quietly in bringing about the desired locking action and are accommodated by the free space between said live axle shafts which is generally available in a conventional differential assembly. Advantage is taken of the pinion shaft as a mounting means for the wedge blocks which are limited in endwise displacement by the differential pinions. The locking force applied by the wedging action binds the differential gears in the housing in a simple and effective manner. The invention has been found to be practical and serviceable in use.

A selected embodiment of the invention is illustrated in the accompanying drawing in which.

Referring to the accompanying drawing, the standard differential assembly will first be recounted. This comprises the differential housing, generally denoted at 6, which is secured to the tubular axle housing members 7 through which the aligned axle shafts 8 extend to their respective road wheels as will be well understood in the art.

Figure 1:
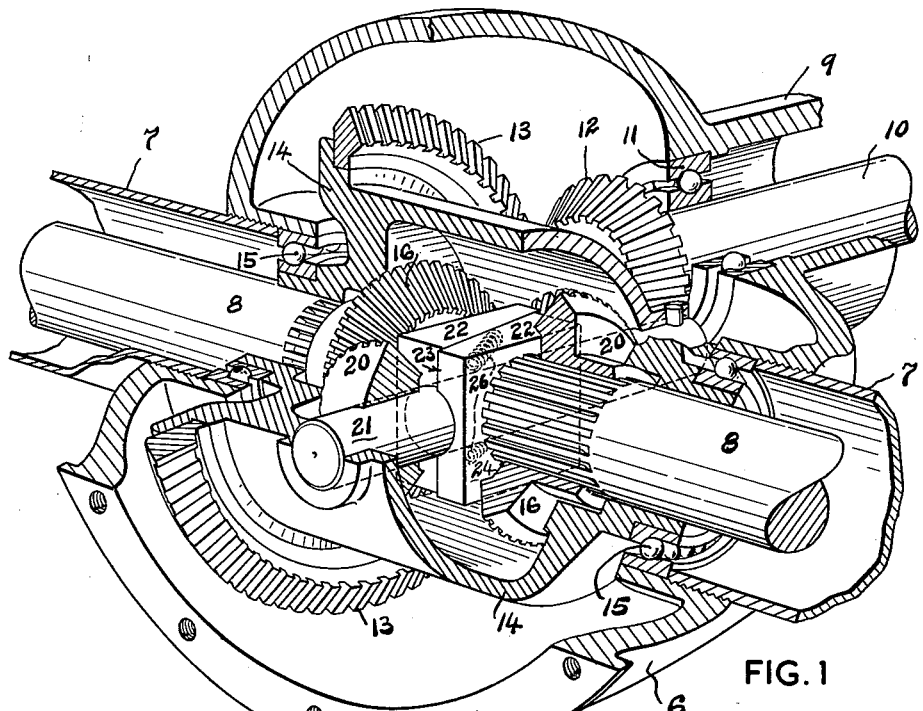
FIG. 1 is a sectionized perspective view of a conventional differential assembly incorporating the locking device of the present invention.
Figures 2, 3, 4:
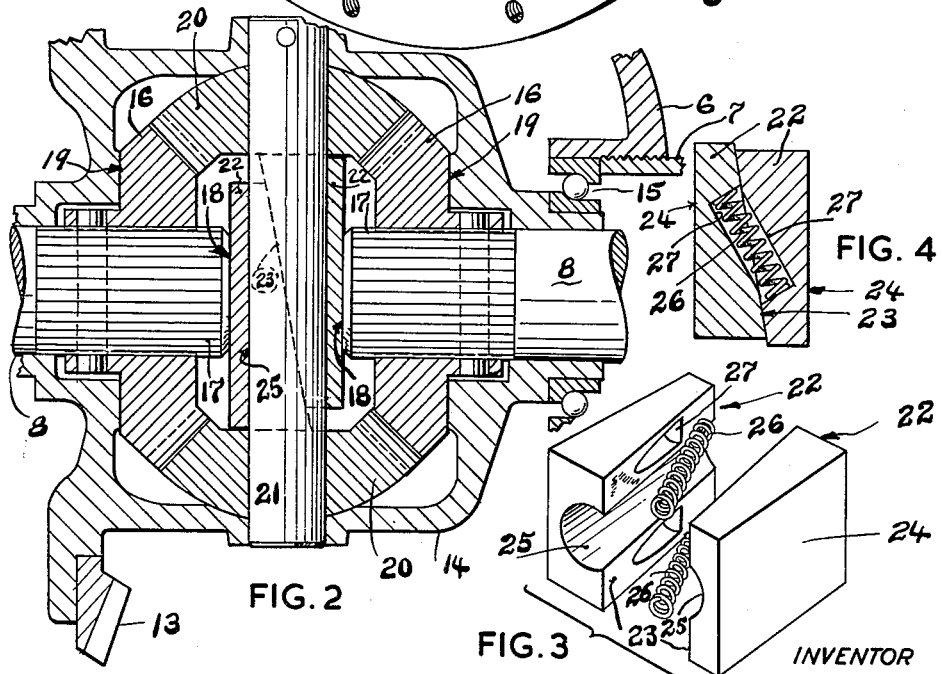
FIG. 2 is a longitudinal sectional view taken through the differential housing with the locking device in normal operative position.
FIG. 3 is a perspective exploded view of the co-acting wedge blocks and depicting two compression springs with seating pockets in the mating inclined faces of the blocks to bring about the spreading action.
FIG. 4 is a sectional view of the assembled blocks taken through companion spring pockets with a spring seated in the pocket to supply a spreading force.

The tubulation 9 of the differential housing 6 surrounds the stub shaft 10 which forms a part of the propellor shaft and is connected to the universal joint (not shown). Shaft 10 is journalled in part by the anti-friction bearing 11 and is keyed to the driving bevel gear 12 which is in mesh with the crown gear 13 on the differential case 14. The anti-friction bearings by which the differential case 14 is journalled are shown at 15 and the differential gears are indicated at 16. These differential gears are usually splined on the respective ends 17 of the live axle shafts 8 which extend into the differential case 14. The terminal faces of shafts 8 are indicated at 18, and usually these faces are spaced as shown in FIG. 2.

The lateral thrust faces of the differential gears 16 are denoted at 19 and these radial thrust surfaces enable the differential case 14 to take the outward axial thrust arising from the driving effect of the meshing differential pinions 20, shown as mounted, as usual on the pinion shaft 21, which extends diametrically through the differential case 14 with its axis intercepting the space between axle shafts 8, as customary.

Having recounted the conventional arrangement of the differential assembly as disclosed in the drawing, the improved locking device will now be described. The differential gears 16 and the meshing pinions 20 define a central free space into which projects the spaced ends 17 of the live axle shafts 8 with their terminal faces 18 at right-angles to the axes of said axle shafts.

The improved locking device comprises the pair of similar wedge blocks 22, 22 which may be steel members of suitable hardness to withstand wear. These wedge blocks have mating wedging faces, indicated at 23, and these wedge faces are inter-engaged and provide camming faces whereby movement of one of the wedge blocks relative to the other in the direction of the wide end thereof produces a spreading effect whereby the outer abutment faces 24 are displaced at a greater distance apart. The wedge faces 23 at the inner sides of the wedge blocks are longitudinally recessed as at 25 to jointly provide a bore of a diameter to receive the pinion shaft 21 and to slide endwise thereon. The wedge blocks are located in the free space intervening the adjoining ends 17 of axle shafts 8 with their outer faces 24 in abutment with the terminal end faces 18 of these shafts. According to this arrangement, and as depicted in FIG. 2, the pinions 20 serve to limit the endwise spreading movement of the wedge blocks.

Spring means are employed to normally exert the spreading displacement effect whereby the wedge blocks are normally held with their outer faces 24 in frictional engagement with the terminal abutment faces 18 of the axle shafts 8.

The spring means desirably comprises helical compression springs 26 flanking the pinion shaft 21 and seated in companion pockets 27. These springs are entirely enclosed in the wedge blocks as best shown in FIG. 4. The springs may vary in number according to dictates of manufacture. Moreover, it is not intended that the invention shall be restricted to the particular mounting arrangement of the springs although this has been found to be satisfactory.

Since the springs exert endwise pressure on the wedge blocks there is an induced wedging action by which the blocks are held in frictional contact with the terminal faces 18 of shafts 8 at all times. This brings about a locking action on the part of the wedge blocks whereby the differential gears are locked by a jamming action in the differential case 14 and must turn as a unit therewith. However, when one of the differential gears turns faster than the other as in a turning movement on the part of the vehicle this functions to dissipate the wedging action and to release the differential gears for independent rotation during the turning movement of the vehicle, whereupon it is restored. To describe the function in another manner, the wedge blocks 22 are urged longitudinally with respect to each other by the compressed springs 26. The outer faces 24 of the blocks 22, due to the resultant force imposed by springs 26, are frictionally engaged with the spaced ends 18 of the axially aligned shafts 8 and the thrust faces 19 of the differential gears 16 will engage the housing 14.

This arrangement provides a torque transmitting clutch means in the differential which is effective to impose a continuous resistance to relative rotation between shafts 8, gears 16 and housing 14 due to resultant friction on faces 19 of gears 16 during torque transmittal below a certain value.

During conditions of slippery roads, etc., torque transmittal to the axles 8 will be transmitted simultaneously and substantially equally to both axles, however, the differentiating between the axles 8 will still be permitted during a torque differential between the axles, i.e., when a vehicle is making a turn and one axle turns at a greater speed of rotation than the other, for example, and a torque is present sufficient to overcome the frictional force of compressed springs 26.

According to the description just given of the operation of the invention it will be clear that the wedge blocks, acting under the pressure of the springs 26, function to lock shafts 8 along with the differential gears and housing 14 during straight-ahead driving but unlocking takes place for cornering.

From the preceding description it will be manifest that my invention provides a highly serviceable and efficient locking device of the kind described. It is to be understood that such changes and variations may be resorted to as fairly come within the scope of the appended claims.

What I claim is:

1. A differential assembly comprising a driver differential case journalled for rotation, two aligned live axle shafts suitably journalled and extending into said differential case and having spaced ends therein, said ends having terminal abutment faces at right angles to the axes of said axle shafts, differential gears fixed on said ends of said axle shafts and having end thrust bearings, differential pinions journalled in said differential case and in mesh with said differential gears, and a differential locking device within said differential case and rotatable therewith, said locking device including co-acting wedge blocks disposed transversely of and between said spaced ends of said axle shafts and engaged frictionally with said terminal abutment faces thereof, spring means engaging said wedge blocks and normally urging them transversely of and into engagement between said spaced axle ends, and camming faces on said wedge blocks disposed transversely of said axle ends for effecting spreading displacement of said blocks due to said spring means for imposing a predetermined residual load on said differential gears and axle shafts.

2. A differential assembly comprising a driver differential case journalled for rotation, two aligned live axle shafts suitably journalled and extending into said differential case and having spaced ends therein, said ends having terminal abutment faces at right angles to the axis of said axle shafts, differential gears fixed on said ends of said axle shafts and having end thrust bearings, said differential case precluding spreading of said differential gears, differential pinions journalled in said differential case and in mesh with said differential gears, and a differential locking device within said differential case and rotatable therewith, said locking device including co-acting wedge blocks disposed transversely between said spaced ends of said axle shafts and engaged frictionally with said terminal abutment faces thereof, said wedge blocks supported for movement transversely of said axle shafts and having complementary engaged camming faces transversely of said ends of the axle shafts for effecting spreading displacement of said blocks and spring means engaged between said blocks and urging said blocks transversely of said axle ends for imposing a pre-load on said differential gears and axle shafts to permit differential movement of said shafts at predetermined torque conditions.

3. A differential assembly comprising a driver differential case journalled for rotation, two aligned live axle shafts suitably journalled and extending into said differential case and having spaced ends therein, said ends having terminal abutment faces, differential gears fixed on said axle shafts, differential pinions journalled in said differential case and in mesh with said differential gears, and a differential locking device within said differential case and rotatable therewith, said locking device including co-acting wedge blocks disposed transversely between said spaced ends of said axle shafts and engaged frictionally with said terminal abutment faces thereof, said wedge blocks supported for movement transversely of said axle shafts, and said wedge blocks including co-operating cam means for causing outward movement of said blocks due to relative transverse movement therebetween, and resilient means urging said blocks transversely with respect to each other for imposing a residual friction pressure on said abutment faces.

4. The structure of claim 3, wherein inter-engaged wedge surfaces provide said cooperating cam means for effecting spreading displacement of said wedge blocks.

5. The structure of claim 3, wherein inter-engaged wedge surfaces provide said cooperating cam means for effecting spreading displacement of said wedge blocks, and wherein said wedge surfaces are inclined to a plane at right angles to the aligned axes of said axle shafts.

6. The structure of claim 3, said wedge blocks having mating wedge faces which constitute said cooperating cam means, and in which said resilient means comprises at least one coil spring mounted on said wedge blocks to spread them into frictional engagement with said abutment faces.

7. The structure of claim 3, said wedge blocks having mating wedge faces which constitute said cooperating cam means, and in which said wedge blocks are recessed at their mating wedge faces to jointly provide a pocket, said resilient means comprises at least one helical compression spring seated in said pocket and operative to spread said wedge blocks into frictional engagement with said abutment faces.

8. The structure of claim 3, said differential pinions being journalled on a shaft fixed to said differential case and extending transversely between said axle shafts, and said wedge blocks having mating wedge faces which constitute said cooperating cam means and include mating recesses received on said pinion shaft for permitting relative movement of said wedge blocks therealong.

References Cited in the file of this patent
UNITED STATES PATENTS
2,850,922    Welsh _____ Sept. 9, 1958